May 21, 1968 L. A. MEACHAM 3,384,844

NEGATIVE IMPEDANCE DEVICE

Filed June 14, 1965 2 Sheets-Sheet 1

$Z_N = -kR_3$

INVENTOR
L. A. MEACHAM
BY Roy M. Porter Jr.
ATTORNEY

United States Patent Office 3,384,844
Patented May 21, 1968

3,384,844

NEGATIVE IMPEDANCE DEVICE

Larned A. Meacham, New Providence, N.J., assignor to Bell Telephone Laboratories, Incorporated, New York, N.Y., a corporation of New York Filed June 14, 1965, Ser. No. 463,601
7 Claims. (Cl. 333—80)

ABSTRACT OF THE DISCLOSURE

Each one of two transistors of opposite conductivity has its base electrode connected to the collector electrode of the other transistor and has its emitter electrode connected to a respective opposite one of two input terminals of a constant current source. A biasing network including an impedance connected from the base electrode to the emitter electrode of each respective transistor and a control impedance connected between the base electrodes biases each transistor in its linear operating region to provide a negative impedance proportional to the resultant current through the control impedance.

This invention pertains to negative impedance devices and more particularly to negative impedance devices using active elements.

It has always been desirable to obtain a simple and effective negative impedance device for use in a multitude of applications wherein distortionless and lossless operation is desired. One specific application where such a device would be of substantial usefulness is in two-wire or bi-directional telephone transmission lines. If the conductor resistance could be neutralized, the need for coarse wire, equalizers and loading coils would be obviated since conductor resistance is a prime source of transmission loss and frequency distortion.

In the past, various attempts have been made, with limited success, to meet these needs. Arrangements employing thermistors having negative temperature characteristics have been employed and found wanting due to inherent slowness of response to signal frequencies and inability to duplicate desired responses. Transformer-coupled vacuum tube circuits for obtaining negative impedances have had the disadvantages of large bulk, inefficient use of operating power and complexities in frequency response. Other combinations have included circuits which incorporated semiconductor elements but which were found unsuitable for many applications due to limited range of operation and instability of characteristics, both in the negative impedance region and otherwise.

Accordingly, it is an object of the present invention to provide a physically small, stable and reliable negative impedance device.

It is another object of this invention to provide a negative impedance device having stable characteristics substantially independent of likely variations in the active elements.

It is still another object of this invention to provide a current controlled negative resistance device having transient characteristics suitable for a transmission line loading application.

It is another object of this invention to provide a negative resistance device remaining substantially linear over the signal range.

These and other objects of the invention are achieved in accordance with the principles of the invention by providing as a principal feature thereof a pair of transistors of opposite type conductivity connected so that the main current path of each is coupled to a control or gating path of the other. A bias circuit is provided to effect a regenerative augmentation of current flow through the transistors when a threshold value is exceeded. The biasing circuit also includes an impedance connected between the gating circuit paths of the two transistors. The function of this impedance may be thought of as a means for diverting current that would otherwise flow from the main current path of one transistor to the gating path of the other transistor. This "diverted current" is now made to flow from the main current path of one to and through the main current path of the other transistor so that the regenerative tendency of the circuit, once the threshold value of input current has been exceeded, is moderated and controlled. Therefore, assuming that the current is supplied from a source with positive resistance of greater absolute value than the negative resistance of the circuit, the net effect is to permit the circuit to operate stably in the current range associated with the regenerative increase in current. Within this current range the volt-ampere characteristic has a definitely determined negative slope.

More specifically, in accordance with one feature of this invention, an NPN and a PNP transistor are connected with the base or control electrode of each coupled to the collector or main current path of the other. The configuration is biased so that once a threshold value of input current is reached, collector current from one transistor produces forward-bias in the base circuit of the other transistor causing an increase in the collector current of the second transistor which in turn produces forward-bias in the base circuit of the first transistor to further increase in a regenerative manner the first transistor's collector current. Additionally, there is an impedance connected between the base electrodes of the respective transistors to provide a path for diverting nearly all the current that would otherwise flow from the collector circuit of one through the base biasing circuit of the other. This current is now diverted so that it flows from the collector circuit of one, backward through the diverting impedance, and thence through the collector circuit of the other to thereby stabilize and control the regenerative current increase. For currents of operating value applied from a sufficiently resistive source each transistor is thus stably biased within its linear range of operation. The increasing backward current through the diverting impeddance is effectively deducted from the value of forward current therethrough at threshold so that any further increase in input current manifests itself in a corresponding decrease in total current flowing through the diverting impedance. Since the input voltage in this region of current can be approximated by the voltage across the diverting impedance, the input impedance of the device is negative and essentially proportional to the positive impedance connected between the base electrodes.

These and other objects and features will be understood more clearly and fully from the following detailed description and the accompanying drawings in which.

Figure 1:
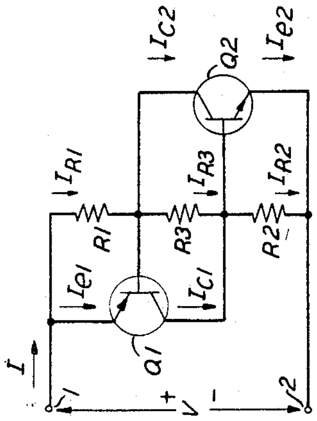
FIG. 1 is a circuit diagram representing one illustrative embodiment of the invention.

Referring now to the drawing, the circuit illustrated in FIG. 1 comprises a PNP transistor Q1 and an NPN transistor Q2 connected with the base of each coupled to the collector of the other and with the emitter of each connected, respectively, to terminals 1 and 2. Resistor R1 connected between emitter and base of transistor Q1, resistor R3 connetced between the respective bases of transistors Q1 and Q2 and resistor R2 connected between the base and emitter of transistor Q2 collectively form the biasing circuit for the configuration.

Figure 2:
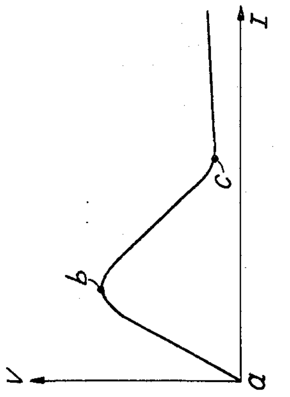
FIG. 2 is a graph representing a typical characteristic of a circuit embodiment.

By applying a current source I to terminals 1 and 2 and measuring the voltage thereacross, the circuit may be shown to have a characteristic curve represented by the graph shown in FIG. 2. As the current is increased from zero, represented by point *a* in FIG. 2, transistors Q1 and Q2 remain nonconducting until the current reaches the threshold value near point *b*. Consequently, the slope of the curve between points *a* and *b* is substantially determined by the sum of the resistance values of resistors R1, R2 and R3. In this range of operation, substantially all of the current I (except for leakage currents) flows from terminal 1 to terminal 2 through resistors R1, R2 and R3, respectively. Once the value of current exceeds that corresponding to point *b* the voltage across each of the resistors R1 and R2 is sufficient to forward-bias the emitter-base junctions of transistors Q1 and Q2 to cause the flow of collector current in each transistor. In the absence of resistor R3, and in the presence of conventional biasing circuitry, all of the collector current from transistor Q1 would be constrained to flow through resistor Q2 to increase the forward-bias of transistor Q2. sistors Q2 to increase the forward-bias of transistor Q2. This would result in increased collector current of transistor Q2 which collector current would cause a corresponding increase in the forward-bias of transistor Q1 since this current is similarly constrained to flow in resistor R1 in parallel with the base-emitter junction of transistor Q1. Therefore, an increase in forward-bias beyond the threshold value would (combined with a corresponding decrease in terminal voltage V unless the current source has zero impedance) manifest itself in a regenerative increase in collector current until both transistors would be driven into saturation. The transistors, somehow biased to threshold in the absence of resistor R3, would operate stably only when either both were cut off or both were saturated and a transition from one stable state to the other would occur very rapidly by the regenerative process described.

The insertion of resistor R3 provides a path through which current from the main current path of transistor Q1 (emitter-collector current) is effectively diverted away from resistor R2 which is connected in parallel with the base-emitter junction of transistor Q2. Collector current from transistor Q1 may now be thought of as being permitted to flow backward through resistor R3 and thence through the collector-emitter path of transistor Q2. As a result, the current through R3 is actually decreased by a current component equal to the current through the emitter-collector path of transistor Q1, while the current through R2 stays essentially fixed, so that there is no significant increase in the forward-bias of transistor Q2 and, consequently, no significant regenerative increase in the forward-bias of transistor Q1. In a similar fashion, resistor R3 provides an effective diversionary path for collector current flowing in transistor Q2 more of which would otherwise flow through resistor R2 to increase the forward-bias of the base-emitter junction of transistor Q1. The net effect of the insertion of resistor R3 is to control the regenerative effect described, permitting the circuit arrangement to operate stably in conjunction with a suitable current source (of finite resistance) within the negative sloping region of its volt-ampere characteristic associated with the regenerative action.

The stable negative sloping volt-ampere characteristic (shown in FIG. 2 between points *b* and *c*) resulting from the controlled forward-biasing of each of the transistors in the regenerative region may now be explained in more detail. At the outset, it is to be noted that the terminal voltage V consists of the sum of the voltage drops across the resistors R1, R2 and R3. As the applied current I increases beyond the threshold value of point *b*, the voltages across resistors R1 and R2 remain substantially constant (or more precisely increase only slightly) since each is determined by the voltage of its associated forward-biased base-emitter junction which sensitively controls collector current between threshold and saturation without rising above a few tenths of a volt. As a result of this constancy of voltage across resistors R1 and R2, the terminal voltage V is approximately equal to the voltage across resistor R3 increased by a small fixed value. As will be shown, the voltage across resistor R3 decreases with increasing current I until transistors Q1 and Q2 saturate at the value of current corresponding to point *c* of FIG. 2. Any further increase in current I reflects itself in a small increase in voltage V due to the slight increase in saturation voltage with increasing current.

The portion of the curve between points *b* and *c* is substantially linear with a negative slope being equal to $|kR3|$ where $k$ is a number smaller than 1. The relatively insignificant deviation from linearity and the restriction of proportionality constant $k$ to values less than unity result from the small increase in voltage across resistors R1 and R2 with increasing current I and deviation from unity of the current amplification factor $\alpha$ for each transistor. Finally, as stated above, the slope of the characteristic curve for current greater than that at point *c* is very small and attributable to the small increase in junction voltage in the saturation region.

It is possible to qualitatively prove the existence of the negative slope in the characteristic curve between points *b* and *c* by considering the effect of the various currents defined in FIG. 1. Assume the circuit is biased to operate at point *b* of the characteristic curve by means of an applied current I and that this current is then increased by an amount $\Delta I$. This increase of current must reflect itself in a corresponding increase in the currents $I_{e1}$ and $I_{e2}$ since the emitter-base junction voltage of transistors Q1 and Q2 does not rise significantly beyond the forward-bias values. Therefore, since the voltage across resistors R1 and R2 is so constrained, currents $I_{R1}$ and $I_{R2}$ remain substantially the same. Assuming the respective current amplification factor $\alpha$ of each transistor is equal to 1, the collector current of each transistor will be equal to the respective emitter current. Consequently, due to the increase in current I by an amount $\Delta I$, each of the currents $I_{c1}$ and $I_{c2}$ increases by an amount equal to $\Delta I$. Furthermore, since the sum of currents $I_{c1}$, $I_{R3}$ and $I_{c2}$ must at all times be equal to the current supplied through terminals 1 and 2, it follows that current $I_{R3}$ must decrease by an amount $\Delta I$ when the impressed current I increases by $\Delta I$. Therefore, as the current I increases between points *b* and *c*, the current $I_{R3}$ decreases correspondingly as does the voltage across resistor R3.

Figure 3B:
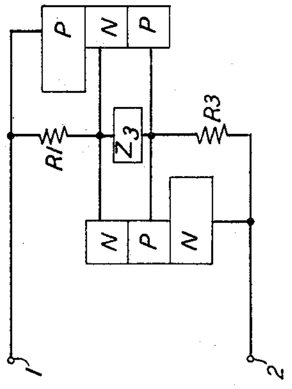
FIGS. 3, 4, 5 and 6 depict other embodiments of the invention.
Figure 3A:
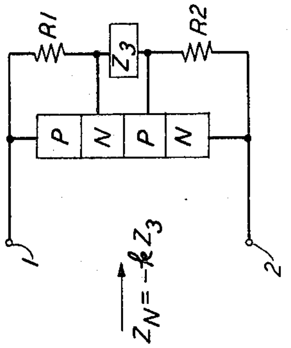

FIGS. 3A and 3B serve to illustrate the fact that the electrical connection between transistors Q1 and Q2 produces an analog for a PNPN device and therefore that a circuit embodiment of the invention shown in FIG. 3A using a PNPN device is possible. Furthermore, as with each of the embodiments disclosed if a generalized impedance Z3 is used in place of resistor R3 shown in FIG. 1, the terminal impedance $Z_n$ will be equal to $-kZ3$. In other words, if Z3 is a generalized impedance having a positive real and a positive imaginary part, the terminal impedance will correspondingly have a negative real and a negative imaginary part. FIG. 3B pictorially illustrates the fact that the PNPN device can electrically be split into a PNP portion and an NPN portion with appropriate electrical interconnections between the split portions to provide a two-transistor analog for the PNPN device.

Figure 4:
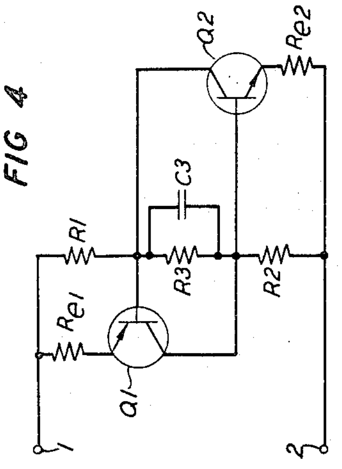

FIG. 4 illustrates another embodiment of the invention wherein the "control" or "diverting" impedance between the base electrodes of transistors Q1 and Q2 is in the form of a parallel RC circuit and wherein resistors are included in the emitter circuit of each transistor to provide negative feedback. By including capacitor C3 in parallel with resistor R3, the circuit becomes more suitably designed for inclusion in transmission lines as a negative impedance loading circuit. The effects of distributed reactance in transmission lines combined with reflections between adjacent loading circuits tend to produce instability unless care is taken that at some frequency the negative impedance of each circuit does not become unstably related to the impedance of the line in which it is inserted. This condition results in some form of self-oscillation even when the line is energized from a regulated direct-current source. Capacitor C3 manifests itself at terminals 1–2 as a negative capacitance in parallel with the negative resistance and thus acts to prevent the condition of instability by introducing effective inductance and by gradually eliminating the negative resistance as frequency increases. The gross effect of the capacitor therefore is to alter the impedance relationships (Nyquist plot) in a manner which insures stability of operation.

As noted above, the portion of the characteristic curve of FIG. 2 between points $b$ and $c$ deviates from linearity because of the increase with rising collector current of the current amplification factor $\alpha$, and because of the small but nonlinear increase in voltage across resistors R1 and R2, as the circuit current I increases in value. This portion of the curve has a slight concave downward slope thereby producing harmonic frequency distortions which may be undesirable for some applications. The effect of the feedback resistors $R_{e1}$ and $R_{e2}$ included in the emitter circuits of transistors Q1 and Q2, respectively, to stabilize the base to collector transconductance substantially increases the linearity and therefore decreases the distortion introduced. Furthermore, the use of feedback reduces the proportionality constant $k$ so that a larger value of resistor R3 must be used to obtain a given negative resistance. The net effect of such an adjustment is to alter the characteristic curve shown in FIG. 2 so that the portion between $a$ and $b$ has an increased slope thereby reducing the minimum usable current of the operating range between points $b$ and $c$. In effect, the current range between $b$ and $c$ is pushed closer to the voltage axis by compressing the current range between points $a$ and $b$.

Figure 5:
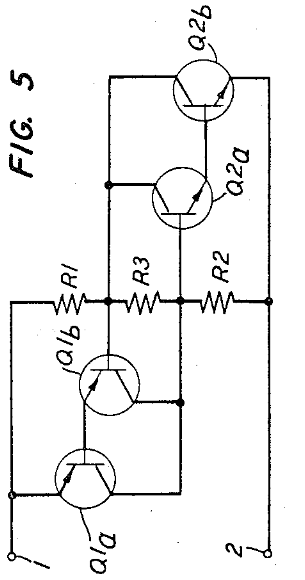

The circuit shown in FIG. 5 is a modification of that shown in FIG. 1 with a two-transistor "piggy-back" circuit of the type disclosed in Patent 2,663,806 to S. Darlington replacing each of the transistors shown in FIG. 1. The purpose of this modification is to improve the linearity of the negative resistance portion of the characteristic curve by effectively increasing towards unity and stabilizing the value of the current amplification factor $\alpha$ of each stage. With one exception the circuit operates in all other respects in a manner identical to that described in connection with the circuit of FIG. 1 since the two transistors of like conductivity in a piggy-back connection are equivalent to a single transistor with a higher $\alpha$. The exception noted is that the threshold for forward-bias across resistor R1 or R2 is essentially twice as great, since each corresponds to two base-emitter junctions in series. As a result, points $b$ and $c$ in FIG. 2 are moved upward, effectively representing a larger expenditure of average operating voltage.

Figure 6:
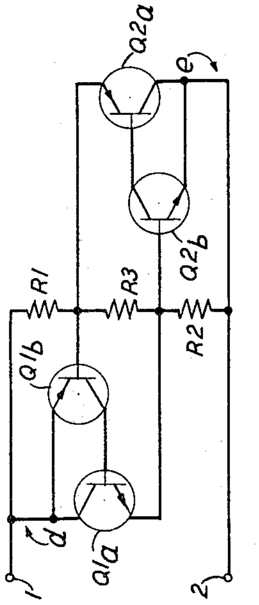

Another embodiment of the invention is shown in FIG. 6. This circuit substantially eliminates the non-linearity in the negative resistance portion of the curve due to both the deviation of $\alpha$ from unity and the varying voltage drop across resistors R1 and R2. In this circuit a pair of transistors $Q1_a$ and $Q2_a$ of opposite conductivity type (NPN and PNP, respectively) act to bypass current in excess of the value shown at point $b$ in FIG. 2 around resistor R3 in a manner similar to the action of transistors Q1 and Q2 in the circuit embodiment of FIG. 1. Transistor $Q1_b$, interposed between transistor $Q1_a$ and the biasing circuit resistor R1, performs as an amplifying device responsive to changes in voltage across resistor R1 to control the base current of transistor $Q1_a$. Since the base and emitter electrodes of transistor $Q1_b$ are connected across resistor R1, any change in voltage across resistor R1 manifests itself in a corresponding current change in the collector of transistor $Q1_b$. Thus, the emitter current sensitivity of transistor $Q1_a$, in response to changes in voltage across resistor R1, is effectively increased by $\beta$ $$\left(\text{approximately equal to } \frac{1}{1-\alpha}\right)$$

the transconductance of the added transistor $Q1_b$. The operation of transistor $Q2_b$ is identical with that of transistor $Q1_b$ so that their combined effect is to heighten the sensitivity of transistors $Q1_a$ and $Q2_a$ to voltage changes across resistors R1 and R2, respectively. The currents through resistors R1 and R2 are therefore constrained to remain extremely constant to effectively produce a linear variation of emitter current of transistor $Q1_a$ and $Q2_a$ with total current I. For this circuit, the points $b$ and $c$ of FIG. 2 are not moved upward as described for the circuit of FIG. 5, as resistors R1 and R2 each bridge only a single emitter-base junction.

Another effect of this circuit configuration is an increase in the value of the proportionality constant $k$ towards unity to cause the negative terminal resistance to more closely approximate the value of resistor R3. If desired, emitter feedback resistances corresponding to those shown in FIG. 4 may be inserted in conductors $d$ and $e$ of FIG. 6 to establish a stable preferred value of constant $k$ that is less than unity. It is to be recognized that appropriately valued resistors may, if needed, be connected between the base and the emitter of transistor $Q1_a$ to prevent thermal instability and to insure that transistor $Q1_a$ is not operated unwantedly by the reverse-biase collector current ($I_{c0}$) of transistor $Q1_b$. A similar statement can be made for the inclusion of a resistor between the base and the emitter of transistor $Q2_a$.

Figure 7:
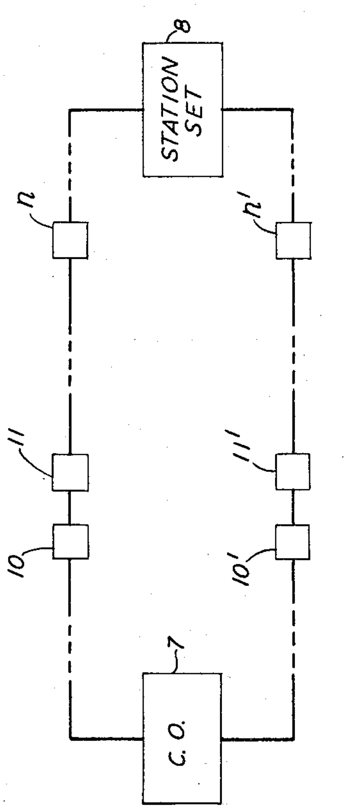
FIG. 7 is an illustrative application of the circuit which is the subject of this invention.

FIG. 7 illustrates one specific application of any one of the circuits shown in the respective embodiments. This figure serves to illustrate how it is possible to obtain a long telephone transmission line connected between a telephone central office 7 at one location and a distant station set 8 at a subscriber's location in a simple, stable, versatile and inexpensive manner. By using the negative impedance elements of the type described, it is possible to reduce wire size and eliminate equalizers and bulky loading coils formerly necessary to reduce the effects of loss and distortion on the lines. Thus, by placing loading circuits 10, 11 . . . $n$ at regular intervals along one side of the line and loading circuits 10', 11' . . . $n'$ in the other side of the line (these loading circuits being negative impedances of the types disclosed herein), the line can be made lossless between the portions so compensated. As is common knowledge, a suitable repeater spacing corresponds roughly to a quarter wavelength at the highest frequency of such a range. By providing in the central office a regulated current source suitable to bias the respective loading circuits in their negative resistance regions and by providing suitable resistive terminations, the line may be rendered essentially distortionless and lossless over a given frequency range. Due to the simplicity of the circuit embodiments disclosed, such an arrangement provides an economically attractive technique for improving bi-directional two-wire transmission lines and consequently improving subscriber service.

It is to be understood that the above-described arrangements are illustrative of the application of the principles of the invention. Numerous other arrangements may be devised by those skilled in the art without departing from the spirit and scope of the invention.

What is claimed is:

1. A two-terminal impedance converter responsive to a current source applied across said two terminals comprising a pair of transistors of opposite conductivity type each having base, emitter and collector electrodes, the base electrode of each respective one of said transistors being connected to the collector electrode of the other transistor and each of the emitter electrodes of said transistors being connected to a respective opposite one of said terminals, and means for stably biasing each of said transistors in their respective linear regions of operation including an impedance connected between the respective base and emitter electrodes of each of said transistors and a control impedance connected between said base electrodes of said transistors to produce an input impedance between said emitter electrodes proportional to the negative of said control impedance.

2. An impedance converter in accordance with claim 1 in which each of said transistors has a resistor connected in series with its emitter electrode to increase the linearity of said negative impedance.

3. An impedance converter in accordance with claim 1 in which a second transistor is associated with each one of the transistors of said pair of transistors, each of said second transistor being of a conductivity opposite to that of the respective transistor it is associated with, said second transistor having its emitter-base path interposed between the control impedance and the collector electrode of said first transistor and having its collector electrode connected to the emitter electrode of said first transistor, whereby voltage variations in said biasing means produce an amplified current input to a respective one of said first transistors to increase the linearity of said negative impedance.

4. A two-terminal impedance converter responsive to a current source connected across said terminals comprising a semiconductor arrangement exhibiting current amplification and having an anode, an anode gate, a cathode gate, and a cathode, a first and second terminal of said converter being connected to said anode and said cathode, respectively, and means for stably biasing said semiconductor arrangement to produce a negative impedance between said terminals, said biasing means including a resistor connected between said anode and said anode gate and between said cathode and said cathode gate, and a control impedance connected between said anode gate and said cathode gate, whereby the value of the negative impedance realized across the said impedance converter is controlled by the resultant current through said control impedance.

5. A multiconductor transmission line having distributed impedance, means for reducing loss in signal transmission including a plurality of negative impedance converters connected at selected intervals in series with each conductor of said line, each of said negative impedance converters comprising an input and an output terminal, a pair of transistors of opposite conductivity type each having base, emitter, and collector electrodes, the base electrode of each respective one of said transistors being connected to the collector electrode of the other transistor and each of the emitter electrodes of said transistors being connected to a respective opposite one of said terminals, and means for stably biasing each of said transistors in its respective linear region of operation to produce a negative impedance between said terminals, said biasing means including an impedance connected between the respective base and emitter electrodes of each of said transistors and a control impedance connected between said base electrodes for varying the magnitude of said negative impedance.

6. An impedance converter comprising an NPN and a PNP transistor each having base, emitter and collector electrodes, means for connecting the base of each of said transistors to the collector of the other, and means for stably biasing each of said transistors in their respective linear regions of operation to produce a negative resistance between said emitter electrodes including a resistor connected between the base and emitter electrodes of each of said transistors and a control resistor connected between each of said base electrodes for varying the magnitude of said negative resistance.

7. An impedance converter in accordance with claim 6 further comprising means for increasing the dynamic stability of said converter in loading applications including a capacitor connected across said control resistor.

References Cited

UNITED STATES PATENTS

| | | | |
|---|---|---|---|
| 2,101,699 | 12/1937 | Baesecke et al. | 178—45 |
| 2,864,062 | 12/1958 | Schaffner | 333—80 |
| 2,904,641 | 9/1959 | Radcliffe | 333—80 XR |
| 2,904,758 | 9/1959 | Miranda et al. | 333—80 |
| 3,144,620 | 8/1964 | Raillard | 333—80 XR |
| 3,223,849 | 12/1965 | Todd | 307—88.5 |
| 3,322,972 | 5/1967 | Csanky | 307—88.5 |

OTHER REFERENCES

"Filternics," Roddam, Wireless World, August 1962, pp. 370–373.

HERMAN KARL SAALBACH, *Primary Examiner.*

ELI LIEBERMAN, *Examiner.*

M. L. NUSSBAUM, *Assistant Examiner.*